United States Patent
Seelgen et al.

(10) Patent No.: US 10,717,573 B2
(45) Date of Patent: Jul. 21, 2020

(54) TUBULAR FOOD CASING HAVING GLUED, PERMANENTLY ELASTIC LONGITUDINAL SEAM

(71) Applicant: Kalle GmbH, Wiesbaden (DE)

(72) Inventors: Michael Seelgen, Idstein (DE); Holger Schlange, Wulsbuettel-Hoope (DE)

(73) Assignee: Kalle GmbH, Wiesbaden (DE)

( * ) Notice: Subject to any disclaimer, the term of this patent is extended or adjusted under 35 U.S.C. 154(b) by 605 days.

(21) Appl. No.: 14/619,418

(22) Filed: Feb. 11, 2015

(65) Prior Publication Data

US 2015/0181899 A1    Jul. 2, 2015

Related U.S. Application Data

(63) Continuation-in-part of application No. 11/767,628, filed on Jun. 25, 2007, now abandoned.

(30) Foreign Application Priority Data

Jun. 27, 2006   (DE) .................... 10 2006 029 401

(51) Int. Cl.
*B65D 65/14*     (2006.01)
*B65D 65/42*     (2006.01)
(Continued)

(52) U.S. Cl.
CPC .......... *B65D 65/14* (2013.01); *A22C 13/0013* (2013.01); *B31B 70/00* (2017.08);
(Continued)

(58) Field of Classification Search
CPC ..... B31B 37/00; B31B 70/00; B31B 2160/20; B31B 2155/00; A22C 13/0013;
(Continued)

(56) References Cited

U.S. PATENT DOCUMENTS

| | | |
|---|---|---|
| 4,401,135 A | 8/1983 | Andrae et al. |
| 4,525,418 A | 6/1985 | Dinklage et al. |

(Continued)

FOREIGN PATENT DOCUMENTS

| | | |
|---|---|---|
| DE | 32 44 372 | 6/1984 |
| DE | 33 33 3 87 A1 | 4/1985 |

(Continued)

OTHER PUBLICATIONS

G. Effenberger, Wursthüllen—Kunstdarm "Sausage casings, artificial skin", Deutscher Fachverlag GmbH, Frankfurt am Main, Germany 3rd Edition [2006] pp. 71-72.

(Continued)

*Primary Examiner* — James C Yager
(74) *Attorney, Agent, or Firm* — ProPat, LLC; Cathy R. Moore (57) ABSTRACT

A shirr-stable, tubular food casing having a glued, permanently elastic longitudinal seam based on a flat fibrous textile material coated with acrylic, collagen and/or a protein derived therefrom is provided. The seam is generated using a reactive hotmelt glue. The glued seam is resistant to boiling for a long time and also exhibits sufficient stability thereafter. Exemplary textile materials include a consolidated nonwoven or spunbonded nonwoven, a woven fabric, loop-formingly knitted fabric, laid fabric, loop-drawingly knitted fabric. To form the casing, the textile material is coated in the flat state. The coated textile material is cut into strips according to the diameter of the casing to be produced and glued using a reactive hotmelt glue, such as a PUR hotmelt glue, to form the tube. The food casing is preferably used as artificial sausage casing or for wrapping cheese or fish.

23 Claims, 4 Drawing Sheets

(51) Int. Cl.
  *A22C 13/00* (2006.01)
  *B31B 70/00* (2017.01)
  *B31B 155/00* (2017.01)
  *B31B 160/20* (2017.01)

(52) U.S. Cl.
  CPC ...... *B65D 65/42* (2013.01); *A22C 2013/0053* (2013.01); *A22C 2013/0069* (2013.01); *A22C 2013/0093* (2013.01); *A22C 2013/0096* (2013.01); *B31B 2155/00* (2017.08); *B31B 2160/20* (2017.08); *B65D 2565/387* (2013.01); *Y10T 428/1307* (2015.01); *Y10T 428/1324* (2015.01)

(58) Field of Classification Search
  CPC .... A22C 2013/0053; A22C 2013/0093; A22C 2013/0096; A22C 2013/0069; B65D 65/14; B65D 65/42; B65D 2565/387; Y10T 428/1324; Y10T 428/1307
  See application file for complete search history.

(56) References Cited

U.S. PATENT DOCUMENTS

| | | | |
|---|---|---|---|
| 5,043,194 A | 8/1991 | Siebrecht et al. | |
| 5,364,674 A | 11/1994 | Saal et al. | |
| 5,527,616 A | 6/1996 | Hatano et al. | |
| 5,744,251 A | 4/1998 | DeCharme et al. | |
| 6,395,356 B1* | 5/2002 | Wielockx | A22C 13/0013 138/118.1 |
| 6,635,275 B1* | 10/2003 | Scott | A61K 9/4816 424/400 |
| 6,784,242 B2 | 8/2004 | Huebener et al. | |
| 2003/0114626 A1 | 6/2003 | Franken et al. | |
| 2004/0071903 A1* | 4/2004 | Ramesh | A22C 13/0013 428/34.9 |
| 2006/0247326 A1 | 11/2006 | Henke et al. | |
| 2007/0116744 A1 | 5/2007 | Andersen et al. | |
| 2007/0166489 A1 | 7/2007 | Foegler et al. | |

FOREIGN PATENT DOCUMENTS

| | | |
|---|---|---|
| DE | 37 04 563 A1 | 8/1988 |
| DE | 38 26 616 A1 | 2/1990 |
| DE | 199 37 341 A1 | 2/2001 |
| DE | 102 25 619 A1 | 12/2003 |
| DE | 103 60 610 A1 | 7/2005 |
| DE | 10360610 | 7/2005 |
| DE | 10 2004 022975 A1 | 12/2005 |
| DE | 31 47 519 A1 | 4/2006 |
| DE | 10 2005 056 574 A1 | 5/2007 |
| EP | 0 101 892 B1 | 9/1986 |
| EP | 0 676 143 B1 | 9/1999 |
| JP | 51-079748 A | 7/1976 |
| KR | 2003 0035644 | 5/2003 |
| WO | WO 2005/033242 A1 | 4/2005 |

OTHER PUBLICATIONS

G. Effenberger, Wursthüllen—Kunstdarm "Sausage casings, artificial skin", Deutscher Fachverlag GmbH, Frankfurt am Main, Germany, 3rd Edition [2006] pp. 47-55.

* cited by examiner

TUBULAR FOOD CASING HAVING GLUED, PERMANENTLY ELASTIC LONGITUDINAL SEAM

CROSS-REFERENCE TO RELATED APPLICATIONS

This application claims priority to pending U.S. patent application Ser. No. 11/767,628, filed Jun. 25, 2007, which claims priority to parent German Patent Application No. 10 2006 029 401.7, filed Jun. 27, 2006. Both U.S. patent application Ser. No. 11/767,628 and German Patent Application No. 10 2006 029 401.7 are hereby incorporated herein by reference in their entireties.

FIELD OF THE INVENTION

The invention relates to a tubular food casing having internal reinforcement and a glued longitudinal seam, a process for production thereof and also use thereof as artificial sausage casing having color and caramel transfer functions but also barrier properties.

BACKGROUND OF THE INVENTION

Tubular sausage casings based on regenerated cellulose having an internal reinforcement of fiber paper in particular of hemp fiber paper, have long been known (see G. Effenberger, Wursthüllen-Kunstdarm [Sausage casings—artificial skin], $3^{rd}$ edition [2006] Deutscher Fachverlag GmbH, Frankfurt a.M., pp. 47-55). These casings, generally termed cellulose fiber skins are generally produced by the viscose process. In this process first a fiber paper is formed to give a tube having overlapping longitudinal edges which is charged with viscose from the outside, from the inside or from both sides using a ring die. The viscose is then regenerated to cellulose hydrate in a precipitation bath.

Cellulose fiber skins may also be produced by the newer amine oxide process. In this process the cellulose is dissolved in aqueous amine oxide, preferably in N-methylmorpholine N-oxide monohydrate. This solution is applied to the fiber paper formed to give a tube. The cellulose is then precipitated in a bath which contains a dilute aqueous amine oxide solution. In this manner a seamless casing may be obtained, as in the viscose process. In contrast to the viscose process, the cellulose in the amine oxide process is not chemically derivatized, but is purely physically dissolved. After stuffing with sausage emulsion, cellulose fiber skins are substantially transparent.

However, all of these processes have the disadvantage that they are highly cost intensive. In addition, the diameter of the casing, that is to say the "caliber", is predetermined by the diameter of the ring gap of the ring die, in such a manner that, on a plant, only one caliber can be produced in each case per die used. A change to a different caliber is therefore associated each time with an alteration and corresponding down time of the plant.

In addition, acrylic- and/or polyvinylidene chloride (PVDC)-coated textile skins (U.S. Pat. No. 4,525, 418=DE-A 31 47 519, DE-A 37 04 563, U.S. Pat. Nos. 5,043,194, 5,744,251 and 5,364,674) are also known. The textile base material used therein can be a consolidated nonwoven, a spunbonded nonwoven or a woven fabric made of natural fibers and/or artificial fibers. Fibers which are mentioned are those of cotton, linen, wool, silk, cellulose esters, regenerated cellulose, polyester, polyamide, polyacrylonitrile, polypropylene and poly(vinyl chloride). The base material is coated with an acrylic emulsion polymer based on lipophilic esters of (meth)acrylic acid with lower alkanols, in particular butyl acrylate. The coating is applied using conventional coating devices, such as an air knife, roll doctor or rubber cloth doctor, in a direct process or in the transfer process. Subsequently the coated strip is formed to give a tube and the seam is closed by gluing, stitching, sealing or welding. By an appropriate choice of the coating, the acrylic-coated textile skin can be made water vapor-permeable and gas-permeable and it is smokable, so that it is also suitable for long-life sausage.

In DE 10 2005 056 574 which was unpublished at the priority date of the present application, a food casing made of a flat fibrous material coated on one or both sides with acrylic resin is disclosed. The casing can also be tubular and have a glued longitudinal seam as shown in the examples. The seam in this case is generated using a hotmelt glue. There are no further details on the type of hotmelt glue.

Suitable glues based on polyurethane were disclosed in US 2003/0050423 A1 and US 2006/0247326 A1.

It is further well known in the art to apply an outermost coating of polyvinylidene chloride ("PVDC") or polyvinyl chloride ("PVC") on the side of the casing facing away from the food to impart water and oxygen barrier properties.

However, the above mentioned casings have some disadvantages. Firstly incomplete coatings owing to lack of adhesion of the hot melt glue to the acrylic used constantly occur. In addition, a casing has different properties in the region of the longitudinal seam produced by a polyamide or conventional PUR hotmelt than in the remaining regions, in particular different elasticity, extensibility and smoke as permeability. The strength of the longitudinal seam frequently weakens under the action of hot water, as is customary in use of the casing for scalded-emulsion or cooked meat sausages. In general, casings having glued seams based on conventional hotmelts have insufficient strength for the increased requirements of modern industrial sausage manufacture, for example automated boiling lines, so that here increased amounts of rejects occur which, in particular, are caused by bursting of the seam.

Applicants have determined that the seam bursts within conventional glued casings because the glue line has a lower extensibility than the casing material, inter alia. During stuffing the casing material is usually extended by 5%. This leads to tensions at the cohesive surface or interface between the coated textile and the glue. Little breakages can occur, resulting in the formation of small tunnels through which sausage emulsion can leak out. In this case, the casing loses its barrier properties. This compromises hygiene in the production due to mold formation along the seam. It might also change the sausage properties. Both are regarded as absolutely unacceptable. Furthermore, the seam can break easily at the cohesive surface between PVDC barrier coatings and the glue.

The machine speed in sausage factories increased during the last decade, hence the conditions of producing the sausage became more drastic. For today's requirements concerning strength and extension, the region of the seam is a weak-point. The seam-line bursts more often during cooking than before and liquid from the sausage emulsion leaks out through adhesion surfaces. Thus the performance of the glue line continues to be a critical point in the overall success of the casing.

SUMMARY OF ADVANTAGEOUS

Embodiments of the Invention

The object was therefore to develop a food casing which no longer has the described disadvantages, or has them only to a very much lower extent. In particular, the advantages of the flat coating shall be utilized, and also optical and haptic properties of the textile skin shall be combined with extensibility and elasticity of the cellulose skin which are approximately uniform over the periphery. The surface, depending on requirements, shall be adjustable from mat to glossy. Its properties, especially its water vapor and oxygen barrier properties and its very high transfer functions for color, caramel and smoke, shall be very similar to those of the coated textile skin, but considerably more uniform. The very good mechanical properties of the textile support material shall be further utilized and the longitudinal seam shall withstand the increased requirements of modern industrial sausage manufacture.

All these objects may be achieved using a fiber-reinforced casing, the longitudinal seam of which is bonded by a reactive hotmelt glue. As will be explained in greater detail below, Applicants have further determined advantageous glue rheology, glue line configurations, bonding area surface treatments and curing conditions that promote greater seam strength values without undue sacrifice to casing flexibility.

DETAILED DESCRIPTION OF ADVANTAGEOUS EMBODIMENTS OF THE INVENTION

The present invention generally relates to a tubular food casing, having transfer properties, made of a coated flat textile material, also referred to herein as support material and/or fibrous material, having a glued longitudinal seam wherein the seam is formed using a reactive hotmelt glue having a particular range of rheological properties. Applicants have further determined that the bonding configuration within the seam, surface treatments applied to the seam, and curing conditions can all be tailored to promote greater seam seal strength, as will be discussed in greater detail below. In that regard, Applicants have determined that a minimum seam strength of 3.0 N is required for a casings to endure the stuffing and cooking processes utilized by commercial sausage manufacturers without breakages. Thus, 3.0 N serves as a reliable lower specification limit (LSL) for the evaluation of the seam strength.

The reactive hotmelt glue used to form the inventive seam bond is preferably a hotmelt glue curing under the action of moisture alone, preferably a polyurethane-based one-component hotmelt glue. This has a multiplicity of side position isocyanate groups which, in the presence of water, react intermolecularly and/or intramolecularly with urethane groups of the polyurethane, forming urea bridging groups. The inventive hotmelt glue does not cure or cross-link via radiation, however. Accordingly, for the production of a glued seam, use is preferably made of a reactive polyurethane-based hotmelt (hereinafter also termed "PUR hotmelt") glue. In advantageous embodiments, the PUR hotmelt glue contains polymer consisting of polyurethane. Compared with the polyamide glues used in DE-A 37 04 563, they have the advantage that they lead to a permanently elastic, absolutely shirr-stable, UV-resistant seam. The coefficients of elasticity of coated support material and the support material which is additionally charged with the PUR hotmelt glue during bonding are virtually identical in this case. Particular preference is given in this case to reactive PUR hotmelt glue having a Brookfield viscosity of 3000 to 7000 mPa·s, preferably from 4000 to 6000) mPa·s, particularly preferably about 5000 mPa·s, in each case measured using an RVT DV-II digital viscosimeter, spindle 27. It is generally known in the art that higher melt viscosity glues result in higher bond strengths. Applicants have found, however, that if the viscosity is above 7.000 mPa·s, the glue can only be processed with difficulty during seam formation. In contrast, if the viscosity is below 3000 mPa·s, then the glue penetrates too greatly into the fibrous material, detrimentally impacting the resulting adhesive bond. The softening temperature of the reactive PUR hotmelt glue is generally below 160° C., preferably in the range from 90 to 130° C. Such reactive PUR hotmelt glues are described, for example, in WO 2005/033242. In addition to polyurethane-based hotmelts, use can also be generally made of those based on polyester or polyamide having similar elastic and tensile properties to the PUR hotmelt glue described above. Such polyester or polyamide hotmelt glues have a higher softening temperature than reactive PUR hotmelt glues. Generally, the softening temperature is below 260° C.

In advantageous embodiments, the glue does not contain particles. Applicants have found that the incorporation of particles generally impedes the stability and elasticity of the hardened glue in a non-acceptable manner. As mentioned above, the stretching behavior of conventional hardened glues without particles is today already too low to withstand the casing cooking process in an acceptable manner.

The food casing of the invention, whose seam is bonded via the reactive, moderate viscosity PUR hotmelt glue described above, has a permanently elastic, boiling-resistant and simultaneously mechanically loadable seam. In contrast to casings whose longitudinal seam was generated using conventional glues, they have higher shear-stability and can be shirred at higher density without glue-breakages to form shirr-stable casings. Thus, the invention provides an additional benefit during downstream processing. The ability to be shirred a higher density is particularly important as current casing strand (or concertina) specifications require 36.5 ft of casing/4 inches of shirr strand and future strand specifications will require 42.0 feet of casing/4 inches of shirr strand. Under the excessive shirring conditions required to form both current and future shirr-strands, the casing is subjected to enormous mechanical stresses in the bond seam.

Surprisingly, Applicants have found that the elasticity of the seam could be improved significantly by applying two or more lines of glue, such as two to four glue lines, each parallel to the casing's longitudinal edge. The two or more lines of glue are each thinner than the conventional, single glue line they replace, with glue the lines being spaced a distance of between 2 to 10 mm apart (based on the glue line center axis), such as a distance of between 4 and 7 mm apart. The inventive multiple glue lines are advantageously approximately half the width of a conventional glue line, such as a width of 1 to 6 mm, particularly 2 to 5 mm.

Over the course of our investigation, we have determined that conventional glue generally exhibits an extension after hardening that is too low to withstand the tremendous forces during the stuffing and cooking process as well as recovery of the structure leading to a breakage of the glue itself, and especially at the adhesion surfaces between glue and the PVDC overcoat typically applied to the casing outermost surface as a barrier coating. The casing thus would lose its impermeability and barrier properties at the glue line. Although not wishing to be bound by theory, the improvement of the elasticity and thus improved maintenance of the barrier properties of the glue line when applying two or more glue lines in lieu of a single line can be explained at least in part by the ability of the unbonded, highly stretchable coated textile in the space that remains between the thinner, multiple glue lines to compensate for any loss of extension imparted by the glue lines themselves.

The seams, particularly when bonded in the form of two or more glue lines, are not only boiling-resistant, but also very resistant to fatty acids. It also has been noticed, that additional stability at highest elongation is imparted as the second and higher glue lines, i.e. the outermost glue lines, still resist breaking once the first, inner line has started to break. Thus each of the glue lines does not fail simultaneously in response to applied stress upon the casing. Surprisingly it has further been noticed, that applying glue in two or more individual lines, the seam also exhibits greater smoke permeability, both due to the unbonded coated textile remaining between the multiple glue lines as well as improved smoke transport through the thinner multiple glue lines. The incorporation of multiple parallel glue lines within the food casing of the invention in addition has the advantage that the glued seam has a very high elasticity with simultaneous seam strength.

Surprisingly, Applicants have further determined that the adhesion of the glue to a single-side PVDC overcoating could be improved by applying a plasma treatment to the area of the seam, particularly to the glue-line area of the seam, prior to applying the glue. This implies a better coatability of the treated surface. During the activation, the surface tension of the PVDC is increased significantly allowing the glue to coat the PVDC completely and form physical bonds to the PVDC more thoroughly. Efficiency has been proven by measuring surface tension before and after treatment using the contact angle method. Measurements have shown that the contact angle between the PVDC surface and the test ink decreased due to the plasma activation, e.g. from 32.2° to 20.2°. The treatment thus improves the adhesion strength of the glue to the PVDC based on improved wetting, and the bond strength of the seam is increased significantly. The surface activation by increased surface tension of the PVDC layer leads to an improved adhesion between the PVDC barrier coating and the applied glue. The activated surface has a chemically different structure in comparison to the non-activated surface, resulting in stronger physical bonds between the activated surface and the glue. Although generally known in other fields, surface activation by plasma treatment is not a state-of-art-technology in the field of sausage casings-manufacture and thus a novelty that is not obvious to the expert.

In addition to increased wetting, the plasma treatment may also promote better glue anchorage into the interstices of the textile material. In forming the inventive bonded seams, the plasma was applied in-line directly upstream of the glue line application. Consequently, the glue was applied within a few seconds after the treatment, at most. In advantageous embodiments, the glue was applied in less than one or two seconds following the surface treatment. Surprisingly, we found that the plasma treatment pre-heated the fabric surface within the seam area. The higher temperature resulted in a lower viscosity of the glue and in an improved flow of the melted glue into the textile interstices to ultimately yield improved glue anchoring upon subsequent solidification of the melted glue within the textile interstices. Alternative suitable casing surface pre-heating devices include infrared heaters and the like.

Any suitable plasma generator may be used. One exemplary plasma generator is a plasma generator from Diener Plasma Beam, Type M1 with a plasma jet. The pressure of the plasma applied may be any suitable pressure above 1 bar, such as 4 bar. The distance of the jet to the casing surface may be any suitable distance, such as a distance of between 1 and 20 mm, preferably between 5 and 15 mm. The treatment is preferably preformed in an air environment, although gases other than air may be used. The plasma treatment may be applied to the casing on one or both sides of the seam. For one side coated casings, the treatment can be applied to the coated surface only, or to both the coated surface and the textile material. In particularly advantageous embodiments, the inventive casings include a single-side PVC or PVDC barrier coating on the side of the casing facing away from the foodstuff. In such embodiments, the plasma treatment may be applied either to the barrier coating surface or the textile material surface or both surfaces.

As noted above, the present invention relates to a food casing having a flat textile support material, which is also referred to herein as an insert. The support material comprises as base material a woven fabric, knitted fabric, or nonwoven fabric made of synthetic fibers or mixtures thereof with natural or regenerated fibers. Exemplary knitted fabrics include loop-formingly knitted fabric and loop-drawingly knitted fabric. Exemplary nonwoven fabrics include laid fabric, consolidated nonwoven or spunbonded nonwoven.

The textile support material is preferably a woven or knitted fabric made of synthetic fibers or a mixture of synthetic fibers with natural or regenerated fibers. Particular preference is given to a thin woven fabric, stretched in the longitudinal and transverse direction, made of polyester, a mixture of cotton and polyester, or a mixture of viscose staple and polyester.

Suitable synthetic fibers are, for example, produced from polyamide, polyester, polyolefin (especially polypropylene), poly(vinyl acetate), polyacrylonitrile, poly(vinyl chloride), poly(vinylidene chloride), or from the corresponding copolymers. These various synthetic fibers may also be used as mixtures, particularly as mixtures with any known natural or regenerated fibers (for example mixtures of cotton and polyester). Suitable natural fibers are, for example, cotton fibers, cellulose fibers (e.g. linen), wool or silk. Materials derived from biopolymers can also be processed or regenerated into suitable fibers. Here, for example, fibers made of regenerated cellulose (=viscose) may be mentioned. Preferred fiber materials are polyester or mixtures of polyester and cotton or polyester and regenerated cellulose.

The thickness of the textile support material, or the weight per unit area, and also the choice of material used to form the support material is dependent on the later use of the casing. In general, the weight per unit area of the textile support material is between 3 and 400 g/m², preferably 8 to 300 g/m², such as 10 to 200 g/m² or 20 to 130 g/m² and more particularly 12 to 75 g/m². The weight per unit area is preferably dimensioned or selected such that the support material is self-supporting. In that regard, as used herein, the expression "flat" is to be taken to mean materials which are relatively thin, but are self-supporting.

Depending on requirements, the support material is extensible or virtually inextensible. Inextensible flat inserts are logical for casings in which a particularly high caliber constancy is of importance.

Commercially available textile support fibrous materials comprising natural polymers are usually pretreated with a sizing material, usually based on starch, modified starch or lubricating reagents. In addition, preservative reagents can also be present in the finish. Since the means used according to the prior art can considerably interfere with the application of acrylic resin and its incorporation into the textile matrix, it must be desized in advance. Sizing materials have also proved interfering which dissolve in aqueous coating dispersions and can accumulate. These are, for example, those based on starch or modified starch, mixtures of water-soluble starch and poly(vinyl alcohol), in addition also lubricating agents and lipids. It is assumed that sizing materials are likewise the essential cause of the spots which occurred in the food casing according to DE-A 38 26 616.

Interfering sizing materials or else interfering preservatives can be removed, for example, by washing or enzymatic treatment. After removal of the sizing material, the textile support material frequently exhibits decreased mechanical stability. By an impregnation of the carrier material, the required mechanical stability can be reachieved. Suitable sizing materials could remain in the textile material.

As a result of the prior desizing of the textile, not only the tightness of the coated casing increased but also the seam strength increased to a certain extent. Casings based on desized textile were accordingly state-of-the-art for many years. They were suitable for industrial processes for producing cooked-meat sausages or scalded-emulsion sausages.

In an alternative embodiment, the textile support material, after desizing, is pretreated in such a manner that it can participate in a particularly strong bonding to the coating material, which is preferably an acrylic resin. Suitable materials are, in particular, those which have a chemical constitution similar to or approaching the coating material, particularly highly dilute aqueous dispersions of the actual coating material or coating polymer. As used herein, the term "highly dilute" refers to dispersions containing less than half the solids of the dispersion used for coating the textile support material, such as less than a quarter of the solids, particularly less than a tenth of the solids. Exemplary dilute dispersions contain polymer in an amount ranging from 40 to 120 g/l, such as from 50 to 75 g/l. It is necessary to pay attention here to the fact that only small amounts are used and not all interstices between the fibers are filled, in order not to impair the adhesion of the coating material during the actual coating.

In embodiments having a single-side coating, the uncoated side of the support material can be coated, or impregnated, for example with solid and/or liquid media, which transfer flavor, color and/or taste to the sausage. Those which may be mentioned in particular in this context are liquid smoke and dry smoke.

Subsequently the textile, for the purpose of stiffening or to achieve optical properties, can be finished again on one or both sides for the coating. Particularly suitable compounds here are melamine-formaldehyde resins, hydroxypropylated starch ethers, other wet strengthening agents and finishes, acetates (for example vinyl acetate/maleic acid di-n-butyl ester), acrylic resins and plastic blends, especially emulsion polymers based on ($C_1$-$C_6$)alkyl (meth)acrylates, in particular butyl (meth)acrylate. The expression (meth)acrylate in this case, as is customary, means acrylate and/or methacrylate. Units of other monomers can occur, for example those of styrene. α-methylstyrene, vinyl acetate-maleic acid di-n-butyl ester or vinyl acetate. The fraction of the units of such other monomers should not exceed 25% by weight, preferably 15% by weight. Suitable acrylic resins are known to those skilled in the art, in particular from DE-A 31 47 519.

Not only the desizing but also the finishing pre-treatment, can be accomplished by any known means, for example by means of foularding (=immersion coating or dip coating), which are sufficiently known to a textile specialist.

The materials used for the pretreatment can be colored by dyes and/or color pigments. In addition, the insert can also be impregnated on one or both sides. By means of such an impregnation, for example, the sausage emulsion adhesion can be set or the mold resistance increased. Impregnation can also comprise transferable color, aroma, odor and/or taste components (for example liquid smoke). However, they can also be applied later to the coated flat material or the tubular casing formed therefrom. These components are expediently used only in a small amount.

In a further embodiment, the support material can be colored using color pigments and/or pigments, during the pretreatment. In the following step, the dyed support material is then preferably coated with colorless acrylic. Likewise, the flat material can be provided with large-area printing or pattern printing.

After completion of pretreatment, the preferably colorless insert can be equally coated on one or both sides with polymer, preferably with silicone-free acrylic resin. The coating proceeds particularly advantageously in a plurality of process steps, particularly preferably in 2 or 3 process steps (hereby coating applied in 3 to 5 layers), with intermediate drying in each case. Addition of dyes and/or pigments to the acrylic can likewise color the casing. For the coating, in addition to polymers such as acrylic resins, use can also be made of collagen and/or proteins derived therefrom, for example desamidocollagen. However, it is also possible to apply the coating, in particular a coating with acrylic resin, indirectly in a transfer process.

As noted above, the casing can if appropriate additionally receive aroma substances, taste substances or odor substances which can be transferred to the sausage emulsion. Those which may be mentioned here are, in particular, dry smoke or liquid smoke. Preferably, the casing contains an impregnation to set the sausage emulsion adhesion.

The oxygen permeability and water vapor permeability of the casing of the invention is adjustable via application of layers, such one or more layers of coating. An additional PVDC layer gives the casing a particularly high water vapor and oxygen barrier property, thus preventing drying out of the sausage and coloring of the sausage emulsion by oxidation. This is particularly of importance in the case of air-sensitive sausage emulsion types such as liver sausage (Leberwurst). The food casing of the invention has a water vapor permeability (as specified in DIN 53 122) of 2 to 2000 g/m²·d, preferably 5 to 1500 g/m²·d. Its oxygen permeability is generally 100 to 1000 cm³/m²·d (determined as specified in DIN 53 380 at 53% relative humidity), measured in a 5 cm² size piece of the easing having a water content of 8 to 10% by weight and a plasticizer content of about 15% by weight.

The casing generally has a water content of about 2 to 20% by weight, preferably from about 4 to 10% by weight. In this regard it is of importance not to complete directly the condensation of the polymer coating. Surprisingly, it has been found that the bonding of flat fibrous material and coating becomes considerably better when a terminating condensation does not take place until on the roll. Between production of the coated broad rolls and the subsequent processing steps (cutting and gluing) there are then at least 2 to 30 days, preferably 15 to 25 days, during which the coated broad rolls are stored in a warehouse under ambient conditions, e.g. about 23° C. and 50% R.H. This improved bonding of the flat fibrous material and coating also leads to a still further improved seam strength.

Customarily, the casing is smoke permeable, but can also be smoke impermeable with a corresponding coating. The extension behavior of the casing is determined by the type and thickness of the coating, but also by the type and strength of the flat fibrous material. For instance, the total extension fraction (elastic and plastic extension) can vary between 1 and 20%, preferably the elastic extension fraction is between 2 and 6%.

Processes and devices for production of the casing of the invention are known per se to those skilled in the art (see G. Effenberger, *Wursthüllen-Kunstdarm* [*Sausage casings—artificial skin*]. $3^{rd}$ edition [2006] Deutscher Fachverlag GmbH, Frankfurt/Main, pp. 71/72).

As noted above, the flat textile support material is preferably coated on at least one side repeatedly with polymer such as acrylic resin, preferably a (meth)acrylic polymer or copolymer, by a flat coating process. The coating is then dried, preferably after each coating step, and should in addition condense or cure for some time. Suitable processes and devices therefore are known to those skilled in the art.

Surprisingly, another aspect of improving the stability of the seam is actually the build-up of the coating layers. It was altogether unexpected that the number of layers within the coating affects the stability of the seam. With a single layer, a break at one point is transferred easily throughout the whole coating layer impeding seam stability. In contrast to this unwanted behavior noted in a single polymer coating layer, we determined that when applying 3 to 5 layers of polymer coating in a lower thickness, the break in any single layer is stopped by other layers which are still intact. When the seam starts to break and destroys the polymer coating layer at one point, the crack is not transported further but stopped by the other, intact layers. Accordingly, small breakages in the seam remain locally focused and the stability of the seam is increased. The inventive, thinner polymer coatings applied to the textile layer are typically applied at a total polymer coating application of 40 to 80 g/m², all based upon the weight of the dried coating.

In a further step, if appropriate, a last coating stroke with PVDC or a VDC copolymer can be performed on top of the polymer coating (such as an acrylate coating) on one or both sides of the textile support material, preferably a PVDC or VDC coating on the side of the textile support material that will be facing away from the foodstuff. After drying, a material thus coated is scarcely permeable to water vapor and atmospheric oxygen, and can therefore be used for what are termed "barrier casings". Thereafter, the coated flat material can be cut into individual strips. If desired, it can be printed before or after cutting, expediently in a flexographic printing process.

The individual strips are then brought via a forming shoulder into a tubular form having overlapping longitudinal edges of 10 to 40 mm, preferably 12 to 30 mm, especially preferred 15 to 25 mm and the overlapping is then fixed using a reactive hotmelt glue. In this case gluing is preferably carried out in such a manner that no projecting "flash" remains. This has the further advantage that bacteria or other microorganisms can virtually no longer penetrate through the seam region. At least two glue lines are applied. As noted above, the glue lines are typically positioned at a distance apart of 2 to 10 mm, such as 4 to 7 mm, preferably from 2 to 5 mm, based on the center of the respective glue lines.

It has been found that it is of importance for the quality of the glued seam that the reactive hotmelt glue used, after melting, is not simply applied in stick form, but rather its viscosity is sufficiently low to form a defined thin film of the melt which is then applied to the upper side of the first longitudinal seam. Only then, after joining the two longitudinal sides, a uniform glued film develops. In the case of the customary stick application, in contrast, this gives a non-uniformly contoured glued surface which frequently runs out of the seam area on one side and then leads to sticking of layers of the reeled material damaging the coating and causing permeability.

In addition, since at least two discrete glue lines are applied, the area in between the glue lines should be free of glue. Only by providing such glue-free zone between the glue lines can the coated textile in this area exhibit its extension properties that compensate for any potential loss of extension due to the glue itself.

Furthermore, it has been discovered that additional glue can be added to the glue lines without broadening the glue lines themselves by maintaining the high temperature of the glue melt application step for a longer time. As noted above, the surface of the textile layer may additionally be preheated via plasma treatment or the like, prior to glue application further facilitating liquid glue diffusion into the textile interstices.

Figure 1A:
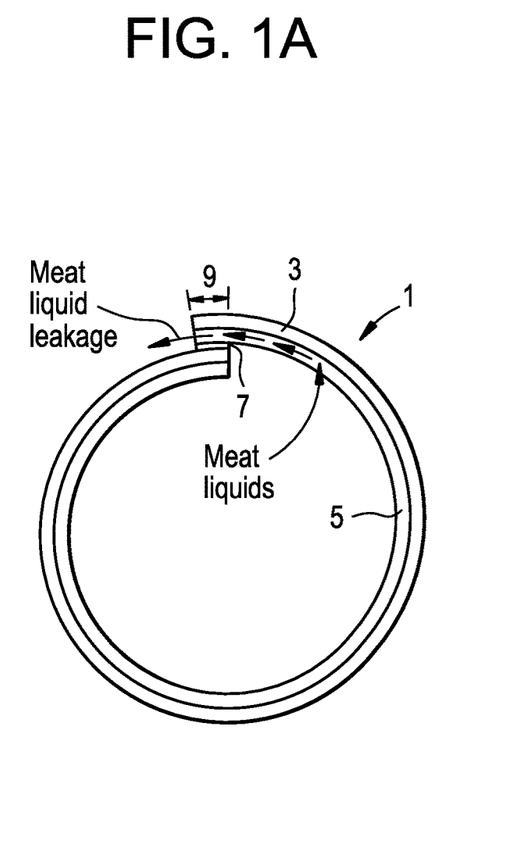
FIG. 1A-B is a schematic cross-section of two one-side barrier coated, textile-based casings illustrating the bond seam including the textile support material, outermost barrier coating and seam adhesive within exemplary conventional (A) and inventive (B) casings.
Figure 1B:
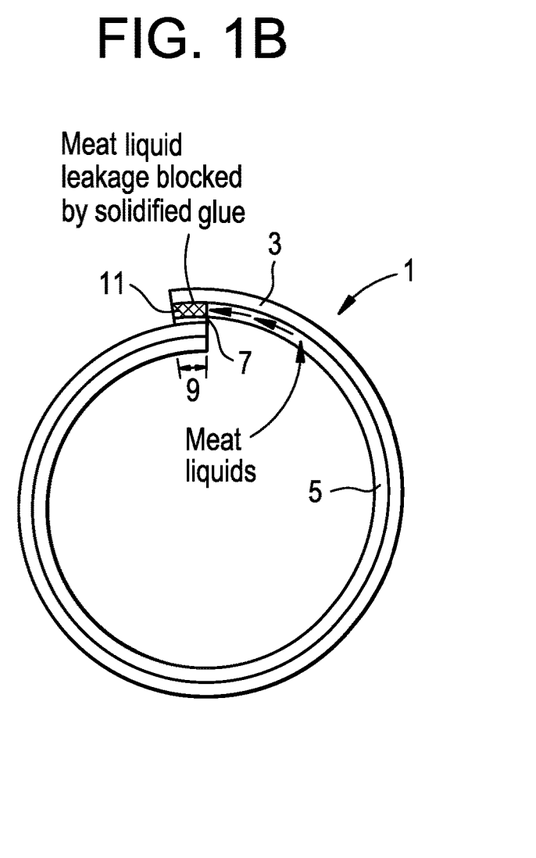

In advantageous embodiments, the melted glue penetrates the entire depth of the uppermost textile layer in the overlapping transverse edges, resulting in a glue matrix in which the textile layer is embedded upon hardening. A cross sectional schematic illustrating the glue penetration into the upper textile of the bond seam is provided in FIG. 1, illustrating casings (1) that include a barrier coating (3), textile material (5) and glue (7) at the seam (9) formed from overlapping transverse casing edges. As shown in FIG. 1, in heretofore known conventional casings (A), the melted glue does not penetrate into the interstices of the upper textile layer in the bond seam. Consequently, conventional casing seams were subject to leakage, as meat liquids and the like readily diffused into the upper textile layer and subsequently migrated within the upper textile layer to the transverse edge of the casing at the bonded seam and exited the seam. In contrast, the glue and/or processing conditions within the inventive casings (B) are selected such that the glue diffuses into the fibers of the upper textile layer (5) of the seam (9) during glue application, with the glue-filled textile layer (11) serving both as an adhesive and a leakage barrier upon hardening. Accordingly, the barrier function of the seam is maintained by filling the upper textile layer with glue. In advantageous embodiments the entire thickness or depth of the upper textile layer in the overlapping transverse casing edges at the glue line is filled with glue, with the glue penetrating into the fibers in the textile support material through the entire depth or thickness of the textile support material. In this way, the inventive improvement in the glue/textile cohesion eliminates visible mold formation commonly found in conventional casings.

Furthermore, it has been found that the glued seam produced with the reactive hot-melt glue increases in strength when it is stored under defined conditions that induce a longer cure time. Particularly expediently, the glued "raw tube" is allowed to react to completion at 25 to 75% relative humidity and 20 to 45° C. for 2 to 10 days, such as from 40 to 60% relative humidity and 30 to 40° C. for 4 to 7 days, and preferably about less than 50% relative humidity and about 35° C. for about 5 days. In contrast, adhesives, specifically PUR adhesives, are typically cured for 3 days under uncontrolled ambient humidity. It is of importance here that the amount of water required for curing is already introduced during the tube forming and the moisture of the ambient air during curing only counteracts diffusion from the glued raw tube but does not participate in the curing reaction. This long-term control of temperature and humidity creates a significant change in the structure of the glue. Under an uncontrolled and rather fast hardening, the chemical structure of the glue remains in the state of a superficial polymerization at the glue surface closest the ambient so environment. In such a form, the glue shows only limited stability towards the aggressive forces during stuffing and cooking of the sausage. Due to the slow built-up of the chemical structure of the present glue under the defined conditions noted above, the chemical structure has sufficient time to settle and the glue polymerizes and hardens completely through its entire depth. Then, the glue contains a structure stable enough to withstand the tremendous forces during stuffing and cooking of the sausage.

In a particular embodiment, tubes may be produced with any desired shapes, preferably with irregularly contoured edges. The resultant irregular casings may likewise be used as food casings, in particular as artificial sausage casings having natural skin optical appearance for more demanding applications.

The casing of the invention may be stuffed with pasty to slightly creamy foods, in particular with sausage emulsion, using conventional stuffing machines. When it is used as sausage casing, it is expediently used in slurred form (as what is termed a shirred stick) or in the form of individual sections. The individual sections in this case are closed at one end, for example by a metal or plastic clip, by tying off with yarn, by knotting, gluing, sealing or welding or stitching (with the seam or the casing or the casing section being able to be formed straight, curved, or in a special way). The sections are pushed individually onto the stuffing horn of the stuffing machine, stuffed with sausage emulsion and closed. Further processing can proceed as customary by scalding, boiling, smoking, ripening etc.

Part of the present invention is therefore also the use of the inventive casing as artificial sausage casing, in particular for raw sausage, scalded-emulsion sausage, or cooked-meat sausage, or as wrapping for cheese or fish.

If desired, the tubular food casing of the invention can be covered with a net which comprises, for example, honeycomb-shaped, octagonal, square or rectangular structures. The net, if appropriate, is also elastic. Such nets are not required, however.

The examples hereinafter are intended to illustrate the invention. Percentages therein are percentages by weight, unless stated otherwise or is clear from the context.

Example 1

A woven fabric of 100% polyester having a weight per unit area of 70 g/m$^2$ and coated with colorless acrylic resin by doctor knife application. After drying and condensation, the textile thus coated had a total weight of 95 g/m$^2$. The open-width product was cut into strips having a width of 152 mm which were then formed on a continuous casing machine at a speed of 0.8 m/s via a forming shoulder to give bond-free tubes having 15 mm overlapping longitudinal edges. The overlapping longitudinal edges were glued in two lines at a center-line distance apart of 4 mm using a reactive PUR hotmelt glue applied at a rate of 0.7 g/s immediately after applying a 10 mm wide plasma surface treatment at both faces of the adhesion surface, i.e. the overlapping longitudinal edges in at least the area to which the glue is subsequently applied. The plasma treatment was applied, upstream of the glue application, in-line to both of the longitudinal edges used to produce the seam of the formed tube via a plasma generator from Diener Plasma Beam, Type M1 with a plasma jet. The pressure of the plasma applied was 4 bar. The distance of the jet to the casing surface was 6 mm. The plasma was applied at a voltage of 280 V, a frequency of 21 kHz, and a current of 10.9 A. The plasma treatment was performed in an air environment. The reactive PUR hotmelt glue had a Brookfield viscosity of about 5000 mPa·s, measured using an RVT DV-II digital viscosimeter, spindle 27. The PUR hotmelt glue was applied in an amount/line of 0.7 g/s.

The casing was tied off and stuffed with salami emulsion. After a ripening time of 12 days, the textile structure was present, though the casing was slightly transparent and therefore the sausage emulsion was visible. The appearance was rated as slightly glossy—transparent textile sausage skin.

Example 2

A mixed woven fabric of 80% cotton and 20% polyester having a weight of 102 g/m$^2$ was enzymatically desized, coated with a 6 wt % butyl acrylate emulsion polymer, dried and subsequently one-side coated with colored 65 wt % acrylic by doctor knife application and dried. After a finishing application of a PVDC outer layer, drying and condensation, the textile thus coated, i.e. the open-width product, had a total weight of 135 g/m$^2$. This open-width product was cut into strips having a width of 365 mm which were then formed to give bond-free tubes with 25 mm overlapping longitudinal edges via a forming shoulder on a continuous casing machine running at a speed of 1.2 ms. Then, a 15 mm wide plasma was applied in-line to both of the longitudinal edges which were used to produce the seam of the formed tube via a plasma generator from Diener Plasma Beam, Type M1 with a plasma jet. The pressure of the plasma applied was 4 bar. The distance of the jet to the casing surface was 5 mm. The plasma was applied at a voltage of 280 V, a frequency of 21 kHz, and a current of 10.9 A. The plasma treatment was performed in an air environment at both edges on the side of the formed tube which was used for gluing.

The 25 mm overlapping longitudinal edges were glued immediately following the foregoing plasma treatment with a reactive PUR hotmelt glue having a Brookfield viscosity of about 5000 mPa·s, measured using an RVT DV-II digital viscosimeter, spindle 27. The PUR hotmelt glue was applied in an amount/line of 0.65 g/s in two lines at a center-line distance apart of 5 mm. The sausage casings produced in this manner were stuffed with cooked-meat sausage emulsion. They had a stuffing caliber of 104 mm. This produced fat-tight sausages having a textile optical appearance, the seam of which was elastic and fat-tight.

After a ripening and smoking time of 5 days, the appearance was rated as colorfast, matt and true to textile.

Example 3

To evaluate the influence of the plasma method on the seam strength, measurements were performed in a larger scale production. Bonded reels were produced in a special way to directly enable comparison of seam strength with and without plasma pre-treatment. The bonded reels were formed from open-width product according to Example 2. The open-width product was initially taken up on rolls. The open-width product was then slit into strips having a width of 365 mm and the strips taken up on reels. A reel of strip was then formed and bonded into a seamed casing via a forming shoulder on a continuously operating casing machine to give tubes in accordance with Example 2. The vast majority of the casing produced was also subjected to a surface treatment prior to glue application, in accordance with Example 2. However, to compare the bonding imparted without the surface treatment, a small length of the casing was not subject to the treatment, i.e. the plasma surface treatment was turned off for a small amount of time during casing formation for each reel.

The samples of non-plasma treated and plasma treated bonded casings were then prepared by cutting 1 m samples of respective untreated and plasma-treated bonded casing from the same production roll. To prepare the samples for tensile testing, a rectangular area 5 cm left and right of the seam was cut out of the casing sample to form the seam sample. Then the seam sample was boiled in a water bath at 95° C. for 60 min (similar to industrial processing). Immediately thereafter the samples were tested. To determine the seam strength of the seam samples, the tensile strength of the bonded seam was measured using a ZPM 1200 from Thümler GmbH and the software ZPM 4. For this, the edges of the sample from both sides of the seam were clamped into both holding clamps of above mentioned test-equipment with a little tension. While tension was applied until the seam line broke an internal load-cell has measured corresponding tension.

As noted above, seam samples were taken from both sections of each reel, those subject to plasma treatment and those not. The data were sorted according to increasing seam strength of the standard samples. The minimum seam strength of 3.0 N is shown as "LSL" in the figure.

Figure 2:
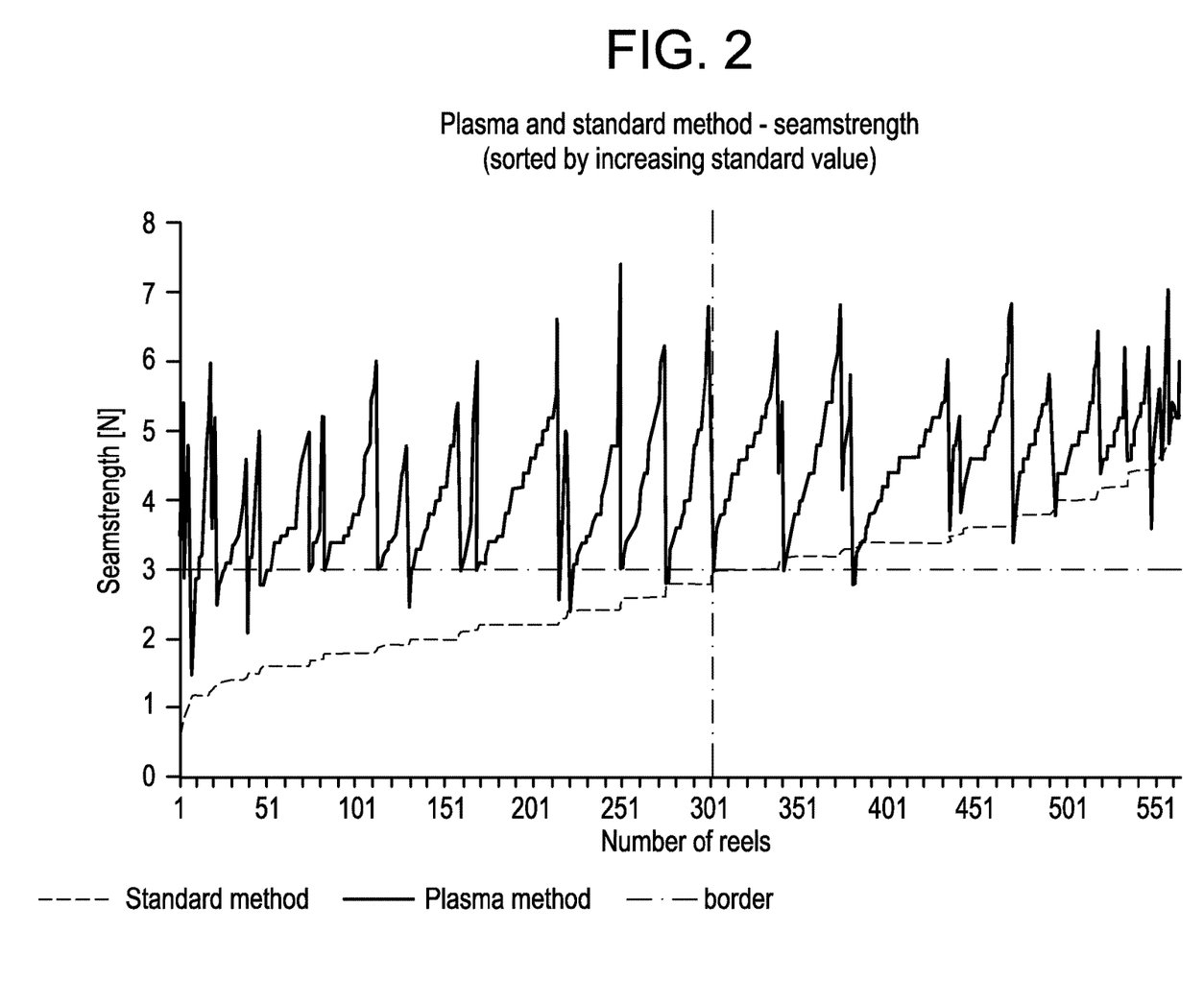
FIG. 2 is a graphical illustration of data from an evaluation of the seam strength values resulting from the standard, non-plasma method of casing bonding, with the data sorted according to increasing seam strength values.

FIG. 2 shows the measured seam strength within that evaluation. In the figures, the seam samples that were not subjected to plasma surface treatment are referred to as "Standard method". All other conditions. i.e. all conditions other than plasma surface treatment, were exactly the same between the Standard and inventive plasma method, as were the casing and glue materials. This implies that all other influences on the seam strength can be excluded. As shown in FIG. 2, from 564 total reels 301 reels formed using the standard, non-plasma treated method are below the "LSL" 3.0 N required to withstand the shirring and stuffing processes. If the entire reel had been formed from such standard, non-plasma treated casing, then these reels would have to be rejected, resulting in an overall reel yield of only 46.6%.

Figure 3:
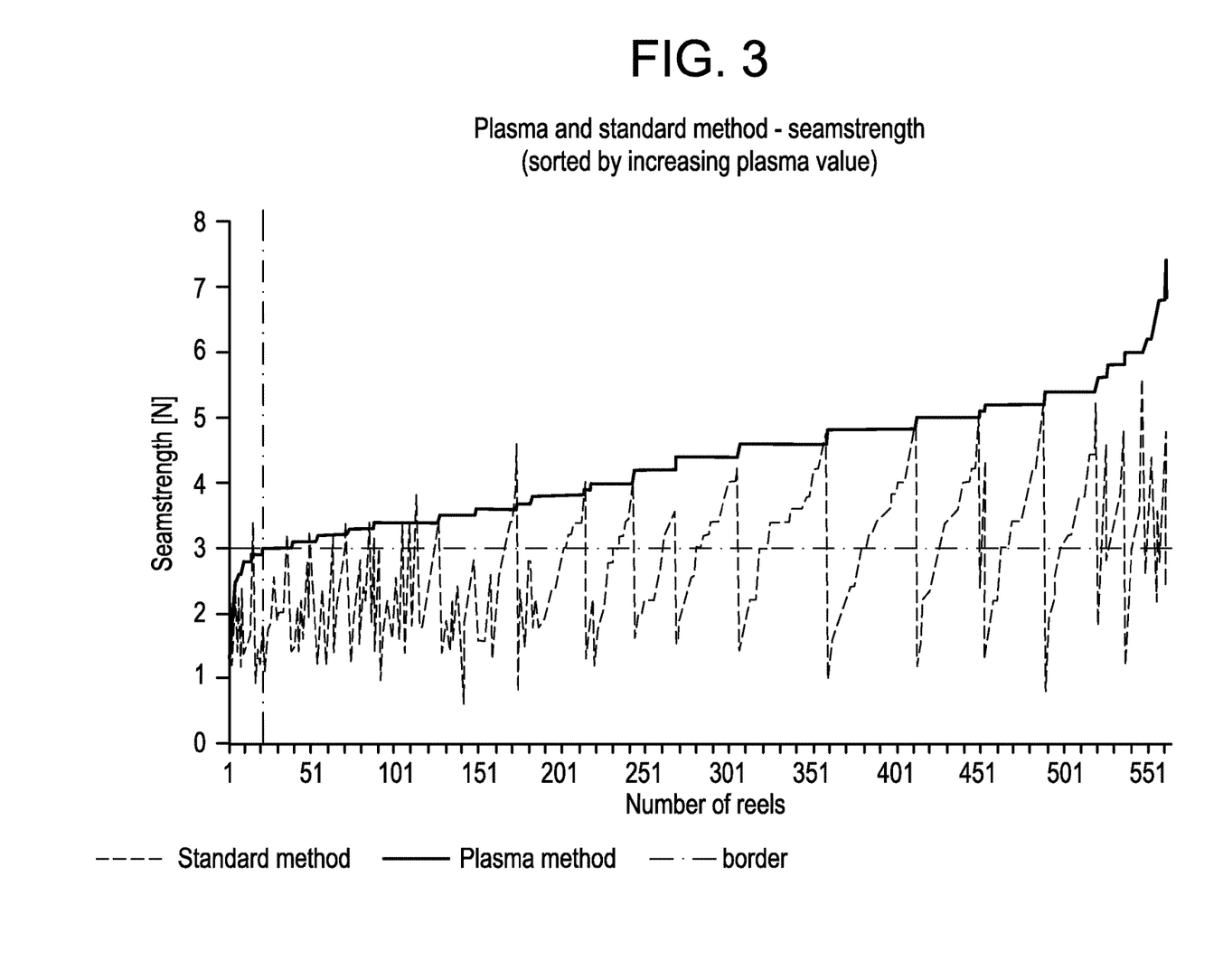
FIG. 3 is a graphical illustration of data from an evaluation of the seam strength values resulting from the inventive, plasma activated method of casing bonding, with the data sorted according to increasing seam strength values.

In contradiction to the above discussed results of the standard method, in FIG. 3 the same data were sorted according to increased values of the inventive plasma method. As shown in FIG. 3, only 19 reels were below "LSL" of 3.0 N. Thus, the overall reel yield associated with the instant invention is 96.6%. The inventive plasma treatment accordingly imparts an at least 107% increase in yield in comparison to casings whose seams have not been plasma-treated.

Figure 4:
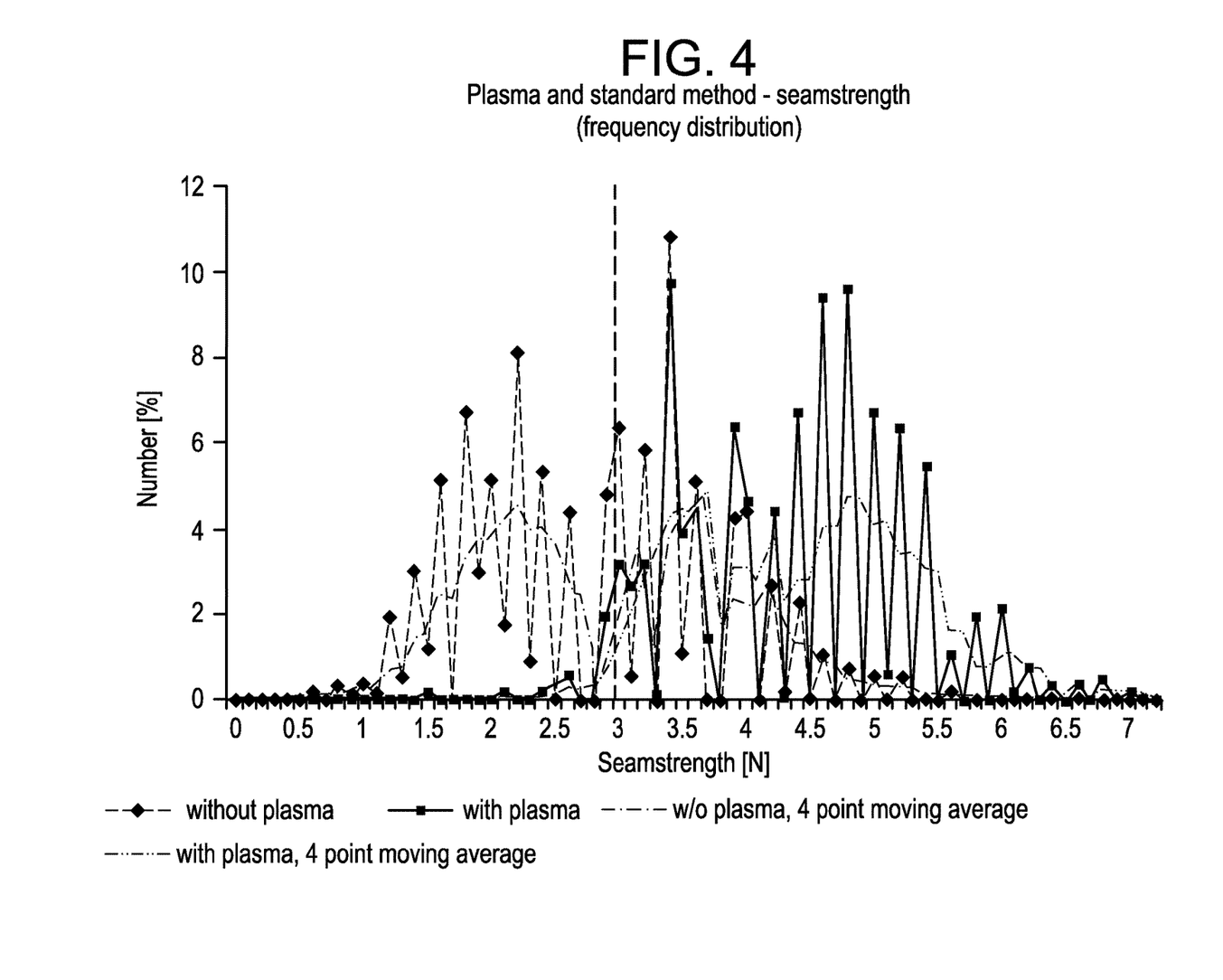
FIG. 4 is a graphical comparison of the frequency distribution of the seam strengths resulting from the evaluation made using the standard non-plasma casing bonding versus the evaluation made using the inventive bonding with plasma activation.

In FIG. 4 the frequency distribution of the seam strength is shown for the inventive samples with plasma activation and the conventional samples without plasma activation. Additionally, the "LSL" for the seam strength of 3.0 N is given. As shown, the inventive samples with plasma activation exhibit higher mean seam strength values, i.e. a mean seam strength of approximately 4.5 N, than the conventional samples formed without plasma pre-treatment, i.e. a mean seam strength of about 2.8 N. Thus the inventive plasma treatment imparts an at least 60% improvement in the mean seam strength compared to conventional, non-plasma treated seam strengths. In addition, a larger number of the untreated samples was below the limit of 3.0 N than of the pre-treated samples. Accordingly, the plasma pre-activation improves the seam strengths and casing yields significantly.

Accordingly, since other influences can be excluded because the samples were taken from the same reel, only from different parts, the plasma process does lead to an increase in yield from 46.6 to 96.6%.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

As noted above, the priority document, German Patent Application No. 10 2006 029 401.7, filed Jun. 27, 2006 is incorporated herein by reference in its entirety, as is parent U.S. application Ser. No. 11/767,628.

As used herein and in the following claims, articles such as "the", "a" and "an" can connote the singular or plural. In addition, all numerical ranges herein include not only the noted end points, but all integers subsumed therein as well, to at least the second decimal place.

All documents referred to herein are specifically incorporated herein by reference in their entireties.

That which is claimed:

1. A shirrable, shin stable tubular food casing comprising a coated flat support material formed into a tube having a glued, permanently elastic longitudinal seam,
   wherein the seam is bonded via a cured, reactive one-component polyurethane-based hotmelt glue that does not contain particles,
   the flat support material comprises synthetic fibers, and
   the flat support material is a woven fabric, loop-formingly knitted fabric, loop-drawingly knitted fabric, laid fabric, consolidated nonwoven, or spunbonded nonwoven,
   the polyurethane-based hotmelt glue has a softening temperature ranging from 90° C. to below 160° C., and the hotmelt glue cure consists of a water-cure, with water introduced during tube formation curing the hotmelt glue,
   the support material has been desized and pretreated with a dilute dispersion of a coating material and a coating, said coating material consisting of acrylic resin(s),
   the glue penetrates into the fibers in the material,
   wherein (i) the polyurethane-based hotmelt glue has a Brookfield viscosity ranging from 3000 to 7000 mPa·s as measured using an RVT DV-II digital viscosimeter, spindle 27; at 40° C., (ii) the casing has a water content of about 2 to 20% by weight, and (iii) the glued seam is reacted at 20 to 45° C. for 4 to 7 days and (iv) the moisture in the ambient air is controlled so that the hotmelt glue cures via the water introduced during the tube formation and the moisture of the air during curing only counteracts diffusion from the glued tube.

2. A shirrable, shin stable tubular food casing comprising a coated flat textile support material formed into a tube having a glued, permanently elastic longitudinal seam,
   wherein the seam is bonded via a cured, reactive polyurethane-based hotmelt glue that does not comprise particles,
   the flat support material comprises synthetic fibers, and
   the flat support material is a woven, knit or nonwoven fabric,
   wherein the polyurethane-based hotmelt glue has a softening temperature ranging from 90° C. to below 160° C., a Brookfield viscosity ranging from 3000 to 7000 mPa·s as measured using an RVT DV-11 digital viscosimeter, spindle 27, at 40° C.,
   and the hotmelt glue cure consists of a water-cure,
   at adhesion surfaces at both edges of the textile, at least two lines of glue are applied at a center line distance of 2 to 10 mm apart and
   the glue penetrates into the fibers in the textile support material.

3. A shirrable, shirr stable tubular food casing comprising a coated flat support material formed into a tube having a glued, permanently elastic longitudinal seam,
   wherein the seam is bonded via a polyurethane-based hotmelt glue that does not contain particles,
   the flat support material comprises synthetic fibers,
   the polyurethane-based hotmelt glue has a softening temperature ranging from 90° C. to below 160° C.,
   the polyurethane-based hotmelt glue has a Brookfield viscosity ranging from 3000 to 7000 mPa·s as measured using an RVT DV-11 digital viscosimeter, spindle 27; at 40° C., and
   a surface of the casing consisting of one or more of the seam adhesion surfaces has been plasma activated prior to glue application, the glue penetrates into the fibers in the textile support material, and the casing exhibits an at least 60% improvement in mean seam strength compared to casings that have not been plasma activated.

4. The food casing as claimed in claim 2, wherein the coated flat textile is coated with 3 to 5 layers of polymer.

5. The food casing as claimed in claim 2, wherein the synthetic fibers are selected from polyester, polyamide, polyolefin, poly(vinyl acetate), polyacrylonitrile, poly(vinyl chloride), or corresponding copolymers.

6. The food casing as claimed in claim 2, wherein the flat support material has a weight of 8 to 300 g/m².

7. The food casing as claimed in claim 2, wherein the food casing has a total weight in the dry state of 40 to 400 g/m².

8. The food casing as claimed in claim 2, wherein the flat support material has been pretreated with a diluted dispersion of the coating polymer.

9. The food casing as claimed in claim 2, wherein the flat support material is impregnated with hydroxypropylated starch ethers, or acrylic resin consisting of ($C_1$-$C_6$)alkyl (meth)acrylates.

10. The food casing as claimed in claim 2, wherein the flat support material is colored with dyes and/or color pigments.

11. The food casing as claimed in claim 2, wherein the flat textile support is coated with acrylic resin.

12. The food casing as claimed in claim 2, wherein, on the inside and/or outside, the food casing further comprises at least one layer having barrier properties for oxygen and/or water vapor.

13. The food casing as claimed in claim 2, wherein, on the inside, the food casing further comprises an impregnation or coating and/or agents which comprise transferable color, aroma, odor and/or taste substances.

14. The food casing as claimed in claim 2, wherein the food casing is finally processed into shined sticks or sections closed at one end.

15. The food casing as claimed in claim 2, wherein said food casing further comprises a PVDC coating layer and has an oxygen permeability of 100 to 1000 cm³/m²d, determined as specified in ISO 7783-2 at 53% relative humidity measured on a 5 cm² size piece of the casing having a water content of 8 to 10% by weight and a plasticizer content of about 15% by weight.

16. The food casing as claimed in claim 2, wherein (i) the polyurethane-based hotmelt glue has a Brookfield viscosity ranging from 3000 to 7000 mPa·s as measured using an RVT DV-II digital viscosimeter, spindle 27; (ii) the casing has a water content of about 2 to 20% by weight, and (iii) the glued seam is reacted at 25% to less than 50% relative humidity and 20 to 45° C. for 4 to 7 days (iv) the hotmelt glue cures via the water introduced during the tube formation alone and (v) the casing has a minimum seam seal strength of 3.0 N.

17. The food casing as claimed in claim 1, wherein said casing is a barrier casing.

18. The food casing as claimed in claim 1, wherein the glued seam is reacted at 25% to less than 50% relative humidity.

19. A shirrable, shirr stable tubular food casing as claimed in claim 2, the lines of glue have a width of 1 to 6 mm.

20. The food casing as claimed in claim 1, wherein the polyurethane-based hotmelt glue has a Brookfield viscosity ranging from 5000 to 7000 mPa·s as measured using an RVT DV-II digital viscosimeter, spindle 27 at 40° C.

21. The shirrable, shin stable tubular food casing as claimed in claim 2, wherein the lines of glue have a width ranging from 1 to 6 mm and are separated by unbonded textile remaining between the glue lines.

22. The shirrable, shin stable food casing as claimed in claim 3, wherein both adhesion surfaces have been plasma activated prior to glue application.

23. The shirrable, shin stable food casing as claimed in claim 3, wherein the food casing comprises at least two lines of glue and the lines of glue have a width ranging from 1 to 6 mm and are separated by unbonded textile remaining between the glue lines.

* * * * *

UNITED STATES PATENT AND TRADEMARK OFFICE
CERTIFICATE OF CORRECTION

PATENT NO. : 10,717,573 B2  
APPLICATION NO. : 14/619418  
DATED : July 21, 2020  
INVENTOR(S) : Seelgen et al.

Page 1 of 1

It is certified that error appears in the above-identified patent and that said Letters Patent is hereby corrected as shown below:

In the Claims

Column 14  
Claim 1, Line 43, delete "shin" insert --shirr--

Column 15  
Claim 2, Line 5, delete "shin" insert --shirr--  
Claim 3, Line 38, delete "RVT DV-11" insert --RVT CV-II--

Column 16  
Claim 14, Line 17, delete "shined" insert --shirred--  
Claim 21, Line 46, delete "shin" insert --shirr--  
Claim 22, Line 50, delete "shin" insert --shirr--  
Claim 23, Line 53, delete "shin" insert --shirr--

Signed and Sealed this  
Twenty-ninth Day of September, 2020

Andrei Iancu  
*Director of the United States Patent and Trademark Office*